United States Patent Office 3,222,406
Patented Dec. 7, 1965

3,222,406
PRODUCTION OF FLUOROCARBONS BY CATALYTIC PYROLYSIS OF FLUOROFORM
Murray Hauptschein, Glenside, and Arnold H. Fainberg, Elkins Park, Pa., assignors to Pennsalt Chemicals Corporation, Philadelphia, Pa., a corporation of Pennsylvania
No Drawing. Filed Dec. 28, 1961, Ser. No. 162,975
4 Claims. (Cl. 260—653)

This application is a continuation-in-part of the copending application Serial No. 159,172, filed December 13, 1961, now abandoned, of Murray Hauptschein and Arnold H. Fainberg.

This invention relates to the production of fluorocarbons by the pyrolysis of fluoroform in the presence of metal fluoride catalysts.

The pyrolysis of fluoroform to produce fluorocarbons is described in U.S. Patent 3,009,966, of Murray Hauptschein and Arnold H. Fainberg. As set out in detail in that patent, it was found that the uncatalyzed pyrolysis of fluoroform produces perfluoroolefins, particularly tetrafluoroethylene and hexafluoropropene, as the major product, with only small quantities of saturated fluorocarbons.

In accordance with the present invention it has now been found that when the pyrolysis of fluoroform is carried out in the presence of certain metal fluorides, the production of saturated fluorocarbons, and particularly saturated perfluorocarbons in the $C_1$ to $C_4$ range, is greatly increased at the expense of the unsaturated products. A salient feature of the invention is its ability to produce good yields of fluorocarbons in the $C_2$ to $C_4$ range, i.e., $C_2F_6$, $C_3F_8$, and $C_4F_{10}$. These materials, prized for their unusual chemical inertness and thermal stability, are useful as low temperature refrigerants, heat exchange fluids and dielectric media.

The metal fluoride catalysts useful in the process of the invention include the fluorides of the metals of groups IA and IIA of the periodic table of elements. In group IA, sodium fluoride and potassium fluoride are preferred although lithium fluoride, rubidium fluoride and cesium fluoride can also be used. The preferred fluorides of group IIA include magnesium fluoride, calcium fluoride, strontium fluoride and barium fluoride. Sodium fluoride is particularly preferred in that it exhibits particular selectivity for the production of $C_2$ to $C_4$ saturated perfluorocarbons. Preferably, the sodium fluoride catalyst consists of sodium fluoride prepared by the removal of HF from sodium bifluoride, $NaHF_2$ by heating at a temperature of 300° C. or higher.

The catalyst can be used in any desired form, e.g., in the form of a fixed bed of pellets, e.g., 1/8" to 1/2" in size, or as a fluidized bed of fine particles in accordance with well known fluidized bed techniques. When employed as a fixed bed of pellets, the reactor may conveniently consist of tubes having a diameter of, e.g., 1/2" to 6" packed with pellets of the desired catalyst. The catalyst bed can be heated by any desired means such as by an electric furnace surrounding the catalyst-packed tube. The catalyst tubes should be constructed of materials resistant to attack by the reactants or reaction products at the operating temperatures. Preferred materials of his type include for example nickel, platinum, stainless steel, Inconel, Monel metal or the like.

During the course of the reaction, free carbon is gradually deposited on the catalyst. This causes a gradual decrease in the activity of the catalyst and after a sufficiently long period, will cause plugging of the catalyst bed. For these reasons, it is desirable to periodically remove this by-product carbon by passing an oxygen containing gas such as air at a controlled temperature, e.g., 500° to 800° C. through the bed to oxidize carbon to CO and $CO_2$ and thus remove it from the catalyst.

The catalytic pyrolysis reaction of the invention is carried out at temperatures of from about 500° to 1100° C., but in no event higher than the melting point of the particular metal fluoride employed. Optimum temperatures of operation will generally lie in the range of 650° to 950° C. where the best combination of relatively high conversions and good yields of saturated perfluorocarbons in the $C_2$ to $C_4$ range will generally be obtained.

The contact time of the reactants with the catalyst may vary over a wide range depending upon the temperature employed. As the temperature increases, shorter contact times are used. Thus, contact times as long as 10 minutes at the lower temperatures to as short as 0.01 second at the upper temperature limit may be employed. In the preferred temperature range of from 650° to 950° C., contact times of from 0.5 to 60 seconds will generally be used. As used herein, contact time is defined as follows:

Contact time (seconds) =

$$\frac{\text{volume occupied by catalyst bed}}{\text{volume of gas per second (calculated at reaction temperature and pressure) fed to the catalyst bed}}$$

Reaction pressure is not critical and may be atmospheric, sub-atmospheric or super-atmospheric. While atmospheric pressure operation will generally be found most convenient, sub-atmospheric pressures, ranging as low as about 25 mm. Hg as a practical limit may be found useful in some cases. Super-atmospheric pressures may range, e.g., up to about 10 atmospheres.

The composition of the pyrolysis products will vary somewhat depending upon the reaction conditions, particularly the temperature and the particular catalyst chosen. In general, higher temperatures somewhat favor higher ratios of unsaturated to saturated fluorocarbons, and accordingly, optimum yields of saturated fluorocarbons are obtained in the intermediate range of temperatures of 650° C. to 950° C. The olefinic products are principally hexafluoropropene and $C_4$ olefins, mainly perfluoroisobutylene. If desired, the olefinic product may be recycled with fresh fluoroform feed to increase the overall yields of saturated fluorocarbons.

In addition to saturated perfluorocarbons ranging from $CF_4$ to $C_4F_{10}$, there is often produced appreciable amounts of perfluorocarbon monohydrides, such as $C_2HF_5$ and $C_3HF_7$. These are formed by the addition of hydrogen fluoride (split off during the pyrolysis) to perfluoroolefins also formed in situ during the pyrolysis. In this regard the metal fluoride catalyst also acts as a catalyst for the addition of hydrogen fluoride to the perfluoro-olefins particularly tetrafluoroethylene.

While the invention does not depend upon any particular reaction mechanism, it is probable that the reaction of the invention involves the following stoichiometry for the various products formed:

Equation (1) $2CHF_3 \rightarrow CF_4 + C + 2HF$
Equation (2) $3CHF_3 \rightarrow C_2F_6 + C + 3HF$
Equation (3) $4CHF_3 \rightarrow C_3F_8 + C + 4HF$
Equation (4) $5CHF_3 \rightarrow C_4F_{10} + C + 5HF$
Equation (5) $2CHF_3 \rightarrow C_2HF_5 + HF$
Equation (6) $3CHF_3 \rightarrow CF_3CHFCF_3 + 2HF$
Equation (7) $4CHF_3 \rightarrow (CF_3)_3CH + 3HF$
Equation (8) $3CHF_3 \rightarrow C_3F_6 + 3HF$
Equation (9) $4CHF_3 \rightarrow C_4F_8 + 4HF$ The presence of hydrogen fluoride in the reaction product and the deposition of free carbon on the catalyst in the course of the reaction both lend support to the above reaction course.

The following examples illustrate the invention.

Examples 1 to 6

A center 15" section of a nickel tube having an inside diameter of ⅞" is packed with 152.5 grams (170 milliliters bulk volume) of sodium fluoride tablets, ⅛" x ⅛" in size. The sodium fluoride catalyst is prepared by heating tablets of sodium bifluoride $NaHF_2$ to a temperature in excess of 300° C. to drive off HF. The catalyst bed is heated by an insulated electric furnace concentric with the tube and 24" in length. Temperatures are measured by a thermocouple placed in a slot in the outer wall of the tube at the center of the furnace.

Fluoroform is passed through the catalyst bed at various temperatures and at a space velocity of 60 volumes of fluoroform (calculated at S.T.P., i.e., 0° C. and 760 mm. Hg) per volume of catalyst bed per hour (contact time of about 15 to 20 seconds). The reactor effluent is passed through a hydrogen fluoride scrubber consisting of a tube packed with sodium fluoride in pellet form held at 100° C. where hydrogen fluoride is removed, and then collected in refrigerated receivers. Product analyses are made by gas-liquid chromatography and infrared spectra. From the total product analyses, the percent conversion of fluoroform to each product is determined on the basis of the stoichiometry shown in Equations 1 to 9 above. The results obtained in a series of six runs at temperatures varying from 600° to 800° C. are summarized in Table I.

Referring to Table I, it may be seen that as the temperature increases at constant space velocity, the total conversion also increases. It will be noted that saturated fluorocarbons, principally $C_2F_6$, $C_3F_8$ and $C_4F_{10}$ were the principal products. The yield of unsaturated material ($C_3F_6$ and $C_4F_8$) somewhat increases as the temperature increases. In Example 6, run at the same temperature as Example 5, a somewhat lower conversion was obtained after a longer period of running apparently due to the deposition of further amounts of free carbon on the catalyst.

fluoroform to various products is determined as in Examples 1 to 6. The results of five runs at temperatures from 600° to 800° C. are summarized in Table II.

Example 12

Using the same equipment and technique described in Examples 1 to 11, fluoroform is passed over a bed of catalyst pellets of barium fluoride at a temperature of 900° C. and at a space rate of 100 volumes of fluoroform per volume of catalyst per hour. A mixture of saturated and unsaturated fluorocarbons mostly in the $C_2$ to $C_4$ range is obtained in good yields and conversions.

It is to be understood that the foregoing embodiments of the invention are for purposes of illustration only and that the invention is not limited thereto.

We claim:

1. A method of preparing fluorocarbons which comprises pyrolyzing fluoroform in the presence of a metal fluoride catalyst selected from the class consisting of the fluorides of the metals of groups IA and IIA of the periodic table of elements, at a temperature below the melting point of said metal fluoride in the range of from 500° C. to 1100° C.

2. A method for preparing fluorocarbons which comprises pyrolyzing fluoroform in the presence of a metal fluoride catalyst selected from the class consisting of the fluorides of the metals of groups IA and IIA of the periodic table of elements at a temperature below the melting point of said metal fluoride catalyst in the range from 650° C. to 950° C.

3. A method in accordance with claim 2 in which said catalyst is potassium fluoride.

4. A method for preparing fluorocarbons which comprises pyrolyzing fluoroform in the presence of sodium fluoride at a temperature in the range of from 650° C. to 950° C.

TABLE I

| Example | Temp., °C. | Total product | Total [a] saturates | Total [a] unsaturates | $CF_4$ | $C_2F_6$ | $C_3F_8$ | $C_4F_{10}$ [b] | $C_2HF_5$ | $C_3HF_7$ | $C_3F_6$ | $C_4F_8$ [c] | Others [d] |
|---|---|---|---|---|---|---|---|---|---|---|---|---|---|
| 1 | 600 | 9.6 | 6.2 | 3.1 | ---- | ---- | 0.7 | 2.6 | 2.6 | 0.3 | 2.5 | 0.6 | 0.3 |
| 2 | 650 | 28.5 | 19.5 | 7.7 | ---- | 3.4 | 3.2 | 6.1 | 6.3 | 0.5 | 4.6 | 3.1 | 1.3 |
| 3 | 700 | 60.0 | 45.1 | 13.4 | 0.3 | 14.9 | 13.0 | 10.7 | 5.7 | 0.5 | 5.2 | 8.2 | 1.5 |
| 4 | 750 | 85.8 | 60.1 | 24.4 | 1.2 | 29.0 | 21.5 | 6.1 | 2.0 | 0.3 | 5.5 | 18.9 | 1.3 |
| 5 | 800 | 93.6 | 70.7 | 22.3 | 1.6 | 45.9 | 21.2 | 1.4 | 0.5 | 0.1 | 3.9 | 18.4 | 0.6 |
| 6 | 800 | 86.4 | 61.4 | 24.4 | 1.0 | 38.1 | 19.1 | 1.3 | 1.7 | 0.2 | 5.4 | 19.0 | 0.6 |

[a] Excluding small amounts of unidentified materials.
[b] Includes n-+iso-$C_4F_{10}$.
[c] Includes $CF_2=C(CF_3)_2$ and cis- and trans-$CF_3CF=CFCF_3$.
[d] Unidentified, mostly higher boiling material.

TABLE II

| Example | Temp., °C. | Total product | Total saturates | Total unsaturates | $CF_4$ | $C_2F_6$ | $C_3F_8$ | $C_2HF_5$ | $C_3HF_7$ | $C_4HF_9$ | $C_3F_6$ | $C_4F_8$ |
|---|---|---|---|---|---|---|---|---|---|---|---|---|
| 7 | 600 | 9.7 | 8.0 | 1.7 | 0.8 | 4.2 | 1.9 | 1.1 | ---- | ---- | 0.6 | 1.1 |
| 8 | 650 | 23.1 | 16.4 | 6.7 | 2.0 | 6.3 | 4.1 | 3.7 | 0.3 | ---- | 2.0 | 4.7 |
| 9 | 700 | 50.5 | 31.0 | 19.5 | 3.6 | 10.0 | 8.5 | 8.0 | 0.6 | 0.3 | 6.2 | 13.3 |
| 10 | 750 | 71.7 | 38.8 | 32.9 | 3.6 | 13.4 | 13.4 | 6.8 | 0.7 | 0.9 | 11.3 | 21.6 |
| 11 | 800 | 81.8 | 42.0 | 36.6 | 2.9 | 18.2 | 16.5 | 2.8 | 0.4 | 1.2 | 13.5 | 23.1 |

Examples 7 to 11

The same equipment is used as in Examples 1 to 6 but the bed of sodium fluoride pellets is replaced by 260 grams of ⅛" tablets of potassium fluoride. Fluoroform is passed through the catalyst bed at a space velocity of 60 volumes of fluoroform (calculated at S.T.P.) per volume of catalyst per hour (contact time of about 15 to 20 seconds) at various temperatures ranging from 600 to 800° C. Product analyses and percent conversion of

References Cited by the Examiner

UNITED STATES PATENTS

| 2,551,573 | 5/1951 | Downing et al. | 260—653 |
| 3,009,966 | 11/1961 | Hauptschein et al. | 260—653 |
| 3,016,405 | 1/1962 | Lovejoy | 260—653 |

LEON ZITVER, *Primary Examiner.*

ALPHONSO D. SULLIVAN, DANIEL D. HORWITZ,
*Examiners.*